(12) United States Patent
Buckel et al.

(10) Patent No.: US 8,753,739 B2
(45) Date of Patent: Jun. 17, 2014

(54) UV-CURING PROTECTIVE LAYER FOR THERMOPLASTIC SUBSTRATES

(75) Inventors: Frank Buckel, Krefeld (DE); Robert Maleika, Düsseldorf (DE); Walter Koehler, Duisburg (DE); Reiner Meyer, Moers (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 11/732,437

(22) Filed: Apr. 3, 2007

(65) Prior Publication Data

US 2007/0237967 A1 Oct. 11, 2007

(30) Foreign Application Priority Data

Apr. 8, 2006 (DE) .................. 10 2006 016 642

(51) Int. Cl.
| | |
|---|---|
| B32B 27/08 | (2006.01) |
| B32B 27/18 | (2006.01) |
| B32B 27/20 | (2006.01) |
| B32B 27/26 | (2006.01) |
| B32B 27/30 | (2006.01) |
| B32B 27/36 | (2006.01) |
| C08F 2/46 | (2006.01) |
| C08F 2/48 | (2006.01) |
| C07D 251/24 | (2006.01) |
| C08K 5/5397 | (2006.01) |
| C08K 5/3492 | (2006.01) |
| C08K 3/36 | (2006.01) |
| C07F 9/53 | (2006.01) |

(52) U.S. Cl.
USPC ........... 428/331; 428/323; 428/412; 428/480; 428/483; 428/522; 522/6; 522/63; 522/64; 522/65; 522/33; 522/39; 524/99; 524/100; 524/115; 524/147; 524/151; 524/430

(58) Field of Classification Search
None
See application file for complete search history.

(56) References Cited

U.S. PATENT DOCUMENTS

| | | | | |
|---|---|---|---|---|
| 4,478,876 A * | 10/1984 | Chung | ............ | 427/515 |
| 4,550,136 A * | 10/1985 | Hosch | ............ | 524/718 |
| 5,213,875 A * | 5/1993 | Su et al. | ............ | 428/209 |
| 5,227,201 A * | 7/1993 | Harper | ............ | 427/407.1 |
| 5,260,443 A * | 11/1993 | Kaitoh et al. | ............ | 546/214 |
| 5,288,778 A | 2/1994 | Schmitter et al. | ............ | 524/100 |
| 5,340,905 A | 8/1994 | Kühling et al. | ............ | 528/199 |
| 5,635,544 A * | 6/1997 | Tamura et al. | ............ | 522/79 |
| 5,663,211 A * | 9/1997 | Kominami et al. | ............ | 522/8 |
| 5,721,292 A * | 2/1998 | Leppard et al. | ............ | 522/64 |
| 5,783,307 A * | 7/1998 | Fagerburg et al. | ............ | 428/412 |
| 6,020,528 A * | 2/2000 | Leppard et al. | ............ | 568/15 |
| 6,060,543 A | 5/2000 | Bolle et al. | ............ | 524/100 |
| 6,114,408 A * | 9/2000 | Dickens | ............ | 522/182 |
| 6,191,199 B1 | 2/2001 | Renz et al. | ............ | 524/100 |
| 6,225,384 B1 | 5/2001 | Renz et al. | ............ | 524/100 |
| 6,251,963 B1 * | 6/2001 | Kohler et al. | ............ | 522/64 |
| 6,255,483 B1 * | 7/2001 | Fletcher et al. | ............ | 544/216 |
| 6,387,519 B1 * | 5/2002 | Anderson et al. | ............ | 428/447 |
| 6,462,884 B2 * | 10/2002 | Hung et al. | ............ | 359/642 |
| 6,468,958 B1 * | 10/2002 | Fletcher et al. | ............ | 510/513 |
| 6,486,226 B2 * | 11/2002 | Al-Akhdar et al. | ............ | 522/18 |
| 6,486,228 B2 * | 11/2002 | Kohler et al. | ............ | 522/64 |
| 6,592,999 B1 * | 7/2003 | Anderson et al. | ............ | 428/447 |
| 6,777,459 B2 * | 8/2004 | Al-Akhdar et al. | ............ | 522/18 |
| 6,790,485 B2 * | 9/2004 | Baumbach et al. | ............ | 427/508 |
| 6,841,670 B2 * | 1/2005 | Fletcher et al. | ............ | 544/216 |
| 6,919,454 B2 * | 7/2005 | Fletcher et al. | ............ | 544/216 |
| 6,998,425 B2 * | 2/2006 | Chisholm et al. | ............ | 522/182 |
| 7,425,586 B2 * | 9/2008 | Weine Ramsey | ............ | 522/74 |
| 2001/0039341 A1 | 11/2001 | Fletcher et al. | ............ | 544/214 |
| 2002/0083641 A1 | 7/2002 | Leppard et al. | ............ | 47/29.4 |
| 2003/0045444 A1 | 3/2003 | Fletcher et al. | ............ | 510/307 |
| 2003/0236327 A1 | 12/2003 | Leppard et al. | ............ | 524/100 |
| 2005/0019281 A1 | 1/2005 | Fletcher et al. | ............ | 424/59 |
| 2005/0059758 A1 | 3/2005 | Leppard et al. | ............ | 524/100 |
| 2006/0052491 A1 | 3/2006 | Braig et al. | ............ | 524/99 |
| 2006/0141207 A1 | 6/2006 | Leppard et al. | ............ | 428/98 |
| 2006/0234061 A1 * | 10/2006 | Buckel et al. | ............ | 428/412 |
| 2012/0114933 A1 * | 5/2012 | Meyer Zu Berstenhorst et al. | ............ | 428/331 |

FOREIGN PATENT DOCUMENTS

| | | |
|---|---|---|
| CA | 2023923 | 3/1991 |
| DE | 101 59 873 A1 | 7/2003 |
| EP | 576 247 A2 | 12/1993 |
| EP | 1 788 009 A1 | 5/2007 |
| WO | 00/67919 | 11/2000 |
| WO | WO 2005/066287 * | 7/2005 |
| WO | 2006/028518 A2 | 3/2006 |

OTHER PUBLICATIONS

European Coatings, 20, (month unavailable) 2004, C. Roscher, p. 7-10, "Tiny Particles, Huge Effect: Performance Enhancement with Silica Nanocomposites".

Chemistry & Technology of UV & EB Formulations for Coating and Inks & Paints, vol. 2, (month unavailable) 1991, N.S. Allen et al, p. 237-285, Reactive Diluents for UV & EB Curable Formulations.

Chemistry & Technology of UV & EB Formulations for Coating and Inks & Paints, vol. 2, (month unavailable) 1991, N.S. Allen et al, p. 73-123, "New Epoxy Acrylate Developments".

(Continued)

*Primary Examiner* — Vivian Chen
(74) *Attorney, Agent, or Firm* — Donald R. Palladino; Robert S. Klemz

(57) ABSTRACT

The present invention relates to a multi-layer product, the first layer being a UV-cured protective layer which contains $SiO_2$ nanoparticles, and the second layer containing a thermoplastic substrate. In addition, the invention relates to the composition of the UV-curable first layer, a process for the production of the multi-layer products and products, such as e.g. glazing products, which contain the named multi-layer products.

12 Claims, No Drawings

(56) References Cited

OTHER PUBLICATIONS

Chemistry & Technology of UV & EB Formulation for Coatings, Inks & Paints, vol. 2, (month unavailable) 1991, pp. 123-135, N.S. Allen et al, "Polyester Acrylates".

Additives for Coatings, (month unavailable) 2000, pp. 164-179, János Hajas, "Levelling Additives".

Polymer Reviews, Chemistry & Physics of Polycarbonates, (month unavailable) 1964, p. 31-76 Hermann Schnell, "Preparation of Aromatic Polycarbonates".

Journal of Polymer Science, Polymer Chemistry Edition vol. 18, (month unavailable) 1980, page 75-90, D.C. Prevorsek et al, "Synthesis of Poly(ester Carbonate) Copolymers".

Encyclopedia of Polymer Science and Engineerring, vol. 11, $2^{nd}$ edition, (month unavailable) 1988, p. 648-718, D. Freitag et al, "Polycarbonates".

Progr Colloid Polym. Sci. 127, (month unavailable) 2004, p. 9-13, H.G. Müller, "Determination of very broad particle size distributions via interference optics in the analytical ultracentrifuge".

\* cited by examiner

UV-CURING PROTECTIVE LAYER FOR THERMOPLASTIC SUBSTRATES

CROSS-REFERENCE TO RELATED APPLICATIONS

The present application claims the right of priority under 35 U.S.C. §1119 (a)-(d) of German Patent Application Number 10 2006 016 642.6, filed Apr. 8, 2006.

BACKGROUND OF THE INVENTION

The present invention relates to a multi-layer product, the first layer being a UV-cured protective layer which contains $SiO_2$ nanoparticles, and the second layer containing a thermoplastic substrate. In addition, the invention relates to the composition of the UV-curable first layer, a process for the production of the multi-layer products and products, such as e.g. glazing products, which contain the named multi-layer products.

C. Roscher in Pitture e Vernici—European Coatings 2004, 20, 7-10, discloses UV-curable organic coating systems containing nanoparticles of silicon dioxide as a coating system which, in comparison to corresponding filler-free coating systems, have a clearly improved scratch resistance and abrasion resistance.

Moldings made of polycarbonate have been known for some time. Polycarbonate, however, has the disadvantage that it is not itself inherently UV-stable. The sensitivity curve of bisphenol A polycarbonate has the highest sensitivity between 320 nm and 330 nm. Below 300 nm, no solar radiation reaches the earth, and above 350 nm this polycarbonate is so insensitive that no further yellowing takes place.

Thus, for a durable coating of a UV-sensitive plastic substrate such as polycarbonate, to produce a multi-layer product also suitable for long-lasting external application, efficient UV protection is required in the first layer.

Typical UV stabilisers used in coatings, are UV absorbers such as 2-hydroxybenzophenones, 2-(2-hydroxyphenyl)benzotriazoles, 2-(2-hydroxyphenyl)-1,3,5-triazines, 2-cyanacrylates and oxalanilides, and radical scavengers of the HALS (hindered amine light stabilizer) type. These additional coating components, with a UV-curing binder, affect the radical crosslinking reaction started by UV light, by competing with the photoinitiator for the UV light or by intercepting the initiator radicals or secondary radicals formed.

In the following, the prior art is combined with multi-layer products, with a first layer consisting of a matrix filled with organic nanoparticles formed by UV curing and containing a UV absorber.

EP-A 0 424 645 discloses a UV radiation-curable coating based on acrylates and colloidal silicon dioxide, in which UV absorbers, specifically a benzophenone type, a cyanacrylate type and a benzotriazole type, and radical scavengers of the HALS type, are mentioned as possible additives. When UV light is used for radiation curing, there is the problem of a hindering of curing as a function of the quantity of UV absorber. Regarding the photoinitiator for curing, according to EP-A 0 424 645 there are no restrictions; 2-hydroxy-2-methyl-1-phenylpropan-1-one (Danocure® 1173 from Ciba Speciality Chemicals) and 2,2-dimethoxy-1,2-diphenylethan-1-one (Irgacure® 651 from Ciba Speciality Chemicals) are specifically mentioned.

EP-A 0 576 247 discloses a coating curable by means of UV radiation based on colloidal silicon oxide, silyl acrylate, acrylate, 2,4,6-trimethylbenzoyldiphenyl phosphine oxide (Lucirin TPO from BASF AG) as photoinitiator and UV absorbers. Sterically hindered amines of the HALS type, fluoroacrylate and alkyl acrylate can optionally be used as additives. Three benzophenone types and two benzotriazole types are named with Cyasorb® UV-416, Cyasorb® UV-531, Cyasorb® UV-5411, Tinuvin® 328 and Uvinul® 400 mentioned as suitable as UV absorbers.

U.S. Pat. No. 5,468,789 discloses a coating curable by means of UV radiation based on colloidal silicon oxide, alkoxysilyl acrylate, acrylate monomer and a special gel-forming inhibitor, wherein optionally UV absorbers such as resorcinol monobenzoate and 2-methylresorcinol dibenzoate can be included.

To achieve adequate protective function for the second layer, the first layer should filter out or absorb the UV light that is harmful for the second layer as much as possible. In the case of polycarbonate as the second layer, therefore, UV light with a wave length of 300 to 340 nm should be filtered out or absorbed from the first layer. This requires both a corresponding quantity of a UV absorber with a high absorption coefficient in the first layer and an adequately thick first layer. This high UV filter action of the UV absorber competes in the curing of the first layer initiated by UV light with the photoinitiator for the light required for the formation of radicals. The additional use of radical scavengers such as HALS as light stabilisers is also difficult because they can intercept the radicals required for the radical start of crosslinking and that are formed from the initiator by UV radiation.

An object of the present invention is to provide multi-layer products with a UV-sensitive substrate such as polycarbonate as the second layer and a UV-curing scratch-resistant and abrasion-resistant protective layer as the first layer. The multi-layer products are distinguished by effective UV protection and high abrasion resistance.

This object is surprisingly achieved by a coating formulation containing at least one special photoinitiator selected from the group consisting of acylphosphine oxide derivatives and α-aminoalkylphenone derivatives which, after application and curing, forms the first layer of the multi-layer product. These special photoinitiators produce, optionally in combination with other photoinitiators, the effective UV-initiated crosslinking necessary for the high abrasion resistance and scratch-resistance which is not impaired by the presence of the UV stabilisers such as triazine derivatives and optionally radical scavengers of the HALS class. The abrasion resistance of the multi-layer products according to the invention with implemented UV protection is on a comparable level to corresponding multi-layer products with siloxane-based coating systems.

SUMMARY OF THE INVENTION

The present invention provides a multi-layer product comprising a first layer (S1) and a second layer (S2), the first layer being a coating prepared from
A) one or more aliphatic polymer precursors selected from the group consisting of
   A.1) aliphatic oligomers containing urethane bonds or ester bonds with at least two acrylate functions per molecule or mixtures of corresponding oligomers and
   A.2) aliphatic reactive diluents with at least two acrylate groups per molecule or mixtures of corresponding reactive diluents, B) one or more fine-particle inorganic compounds,
C) at least one organic UV absorber selected from the group consisting of triazine derivatives and biphenyltriazine derivatives, preferably at least one UV absorber of the biphenyltriazine derivatives,
D) optionally one or more radical scavengers of the HALS class,
E) optionally one or more flow control agents,
F) optionally one or more solvents, and
G) at least one photoinitiator selected from the group consisting of acylphosphine oxide derivatives and α-aminoalkylphenone derivatives,
and the second layer being a thermoplastic polymer.

DETAILED DESCRIPTION OF THE PREFERRED EMBODIMENTS

In a preferred embodiment, the components of the first layer (S1) are used in the following quantity ratios:
a) based on the total mixture of components A and B:
    20 to 95 wt. %, preferably 50 to 80 wt. % component A,
    5 to 80 wt. %, preferably 20 to 50 wt. % component B and
    0.1 to 10 wt. %, preferably 0.5 to 8 wt. %, particularly preferably 1 to 5 wt. % component G, are used, with the total wt. % of components A and B being 100%;
b) the quantity of solvent (component F) is measured so that an experimentally determined solid content of 20 to 50 wt. %, preferably 30-40 wt. %, results for the mixture of components A, B and F; and
c) based on the solid content of the mixture of components A, B and F
    0.1 to 20, preferably 0.5 to 10, particularly preferably 0.8 to 5 wt. % component C,
    0 to 10, preferably 0.1 to 5, particularly preferably 0.2 to 2 wt. % component D and
    0 to 5, preferably 0.1 to 1 wt. % component E are used.

Components and Structure of the First Layer (S1)

Component A

The aliphatic polymer precursors according to component A are selected from at least one of the groups consisting of components A.1 and A.2 wherein
    A.1) are aliphatic oligomers containing urethane bonds or ester bonds with at least two acrylate functions per molecule or mixtures of corresponding oligomers and
    A.2) are aliphatic reactive diluents with at least two acrylate groups per molecule or mixtures of corresponding reactive diluents.

Suitable polymer precursors according to component A with at least two acrylate groups per molecule are preferably those of the formula $$(R^1{}_2C\!\!=\!\!CR^2CO_2)_nR^3 \qquad (I)$$

wherein
    $n \geq 2$,
    $R^1$ and $R^2$ independently of one another are H or $C_1$ to $C_{30}$ alkyl, preferably H, methyl or ethyl and
    $R^3$ in the case of polymer precursors according to component A.1 is an n-valent organic radical which consists of aliphatic hydrocarbon units linked by urethane bonds or ester bonds, or
    $R^3$ in the case of polymer precursors according to component A.2 is an n-valent organic radical, preferably with 1-30 hydrocarbons.

Production of the suitable oligomers according to component A.1 which belong to the class of aliphatic urethane acrylates or the polyester acrylates, and the use of which as coating binders are known and are described in Chemistry & Technology of UV & EB Formulation for Coatings, Inks & Paints, vol. 2, 1991, SITA Technology, London (P. K. T. Oldring (ed.) on pp 73-123 (Urethane Acrylates) or pp 123-135 (Polyester Acrylates). Commercially obtainable and suitable with the meaning according to the invention are, for example, aliphatic urethane acrylates such as Ebecryl® 4858, Ebecryl® 284, Ebecryl® 265, Ebecryl® 264 (manufacturer Cytec Surface Specialities), Craynor® 925 from Cray Valley, Viaktin® 6160 from Vianova Resin, Roskydal® 2258 from Bayer MaterialScience AG, Photomer® 6891 from Cognis or even aliphatic urethane acrylates dissolved in reactive diluents such as Laromer® 8987 (70% in hexanediol acrylate) from BASF AG, Roskydal® 2303 (80% in hexanediol diacrylate) from Bayer MaterialScience AG, Craynor® 945B85 (85% in hexanediol diacrylate) and Craynor® 963B80 (80% in hexanediol diacrylate) from Cray Valley or even polyester acrylates such as Ebecryl® 810 or 830 from Cytec Surface Specialities.

The production and use of suitable reactive diluents according to component A.2 are known and are described in Chemistry & Technology of UV & EB Formulation for Coatings, Inks & Paints, vol. 2, 1991, SITA Technology, London (P. K. T. Oldring (ed.) on pp 237-306 (Reactive Diluents). Suitable within the meaning according to the invention are here for example methanediol diacrylate, 1,2-ethanediol diacrylate, 1,3-propanediol diacrylate, 1,2-propanediol diacrylate, glycerol triacrylate, 1,4-butanediol diacrylate, 1,3-butanediol diacrylate, 1,2,4-butanetriol triacrylate, 1,5-pentanediol diacrylate, neopentyl glycol diacrylate, pentaerythritol triacrylate, pentaerythritol tetraacrylate, 1,6-hexanediol diacrylate, trimethylolpropane diacrylate, trimethylolpropane triacrylate, tricyclodecane dimethanol diacrylate, diethylene glycol diacrylate, triethylene glycol diacrylate, tetramethylene glycol diacrylate, dipropylene glycol diacrylate, tripropylene glycol diacrylate, trimethylol propane triethoxytriacrylate, dipentaerythritol pentaacrylate, dipentaerythritol hexaacrylate, ditrimethylolpropane tetraacrylate and the corresponding methacrylate derivatives. 1,6-hexanediol diacrylate, tricyclodecane dimethanol diacrylate, trimethylol propane triacrylate, pentaerythritol tetraacrylate and the methacrylate derivatives thereof are preferably used. 1,6-hexanediol diacrylate, tricyclodecane dimethanol diacrylate and the methacrylic derivatives thereof, in particular in mixture with component A.1 are particularly preferably used.

Component B

Component B comprises fine-particle inorganic compounds. As used herein, including in the claims, "fine-particle inorganic compounds" shall mean an inorganic compound having a mean particle size ($d_{50}$) of 1 to 200 nm. The fine-particle inorganic compounds preferably consist of at least one polar compound of one or more metals of the $1^{st}$ to $5^{th}$ main group or $1^{st}$ to $8^{th}$ sub-group of the periodic system, preferably the $2^{nd}$ to $5^{th}$ main group or $4^{th}$ to $8^{th}$ sub-group, particularly preferably the $3^{rd}$ to $5^{th}$ main group or $4^{th}$ to $8^{th}$ sub-group, or from compounds of these metals with at least one element selected from oxygen, hydrogen, sulfur, phosphorus, boron, carbon, nitrogen or silicon. Preferred compounds are for example oxides, hydroxides, aqueous oxides, sulfates, sulfites, sulfides, carbonates, carbides, nitrates, nitrites, nitrides, borates, silicates, phosphates, hydrides, phosphates or phosphonates.

Preferably, the fine-particle inorganic compounds are oxides, phosphates, hydroxides, preferably of $TiO_2$, $SiO_2$, $SnO2$, $ZnO$, $ZnS$, $ZrO_2$, $Al_2O_3$, $AlO(OH)$, boehmite, aluminium phosphates, furthermore TiN, WC, $Fe_2O_3$, iron oxides, $NaSO_4$, vanadium oxides, zinc borate, silicates such as Al silicates, Mg silicates, one-, two- or three-dimensional silicates. Mixtures and doped compounds can also be used.

Hydrate-containing aluminium oxides (e.g. boehmite) and silicon dioxide are particularly preferred. Silicon dioxide is in particular preferred.

The fine-particle inorganic compounds according to the invention have a mean particle size ($d_{50}$) of 1 to 200 nm, preferably 5 to 50 nm, particularly preferably 7-40 nm. In particular, the fine-particle inorganic compounds have a narrow particle size distribution with a $((d_{90}-d_{10})/d_{50})$ of the distribution of less than or equal to 2, particularly preferably 0.2 to 1.0. Determination of the particle size is carried out by analytical ultracentrifuging, $d_{90}$ being the 90% value, $d_{10}$ the 10% value and $d_{50}$ the mean of the integral mass distribution of the particle size. The use of analytical ultracentrifuging for particle size determination is described in H. G. Müller Progr. Colloid Polym. Sci. 2004, 127, pages 9-13.

In a preferred embodiment, the surface of these fine-particle inorganic compounds is modified by means of alkoxysilane compounds. Alkoxysilane compounds of the formula

$$R_m Si(OR')_{4-m} \quad (II)$$

with m=1, 2 or 3 and

R and R'=a monovalent organic radical, preferably an alkyl chain with 1 to 30 carbon atoms, are preferably used for this. Surface modification of the fine-particle inorganic compounds is particularly preferably carried out with acrylate-functionalised trialkoxysilane compounds according to

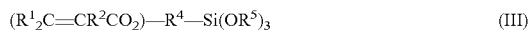
$$(R^1{}_2C=CR^2CO_2)-R^4-Si(OR^5)_3 \quad (III)$$

wherein $R^1$ and $R^2$ independently of one another are H or $C_1$ to $C_{30}$ alkyl, preferably H, methyl or ethyl, $R^4$ is a divalent organic radical, preferably an alkyl chain, with 1 to 30 carbon atoms and $R^5$ is a monovalent organic radical, preferably an alkyl chain with 1 to 30 carbon atoms and particularly preferably methyl and ethyl.

The following acrylate-functionalised trialkoxysilane compounds are particularly preferably used for surface modification of the fine-particle inorganic compounds: (3-methacryloxypropyl)triethoxysilanes, (3-acryloxypropyl)triethoxysilanes, (3-methacryloxypropyl)triethoxysilanes, methacryloxymethyl triethoxysilanes and methacryloxymethyl triethoxysilanes.

In a preferred embodiment, the fine-particle inorganic compound is used as a dispersion in at least one component selected from the group consisting of A) and F). Fine-particle inorganic compounds which are dispersible agglomerate-free in the coating formulation are preferred.

Component C

The UV absorbers within the meaning according to the invention are derivatives of triazine, preferably derivatives of biphenyltriazine. UV absorbers according to the following formula (IV) are preferably used

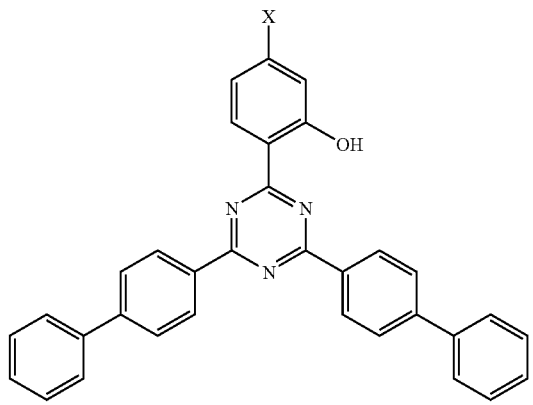

wherein $X=OR^6$, $OCH_2CH_2OR^6$, $OCH_2CH(OH)CH_2OR^6$ or $OCH(R^7)COOR^8$, preferably $OCH(R^7)COOR^8$, $R^6$=branched or unbranched $C_1$-$C_{13}$ alkyl, $C_2$-$C_{20}$ alkenyl, $C_6$-$C_{12}$ aryl or —CO—$C_1$-$C_{18}$ alkyl, $R^7$=H or branched or unbranched $C_1$-$C_8$ alkyl, preferably $CH_3$ and $R^8$=$C_1$-$C_{12}$ alkyl; $C_2$-$C_{12}$ alkenyl or $C_5$-$C_6$ cycloalkyl, preferably $C_8H_{17}$.

A UV absorber according to formula (IV) with $X=OCH(R^7)COOR^8$, $R^7=CH_3$ and $R^8=C_8H_{17}$ (UV absorber CGL479 from Ciba Speciality Chemicals) is particularly preferably used as component C.

The biphenyl-substituted triazines of general formula (IV) are known in principle from WO-A 96/28431; DE-A 197 39 797; WO-A 00/66675; U.S. Pat. No. 6,225,384; U.S. Pat. No. 6,255,483; EP-A 1 308 084 and DE-A 101 35 795.

In a preferred embodiment, the UV absorbers have a high UV absorption in the range of the greatest sensitivity of the second layer, particularly preferably the UV absorbers have a UV absorption maximum between 300-340 nm.

Component D

Component D according to the invention are so-called HALS (hindered amine light stabilizer) systems. A further stabilization is thereby achieved. The HALS systems are amines according to formula (V)

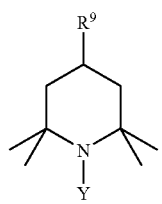

wherein $Y=H; R^6$ or $OR^6$ $R^6$=branched or unbranched $C_1$-$C_{13}$ alkyl, $C_2$-$C_{20}$ alkenyl, $C_6$-$C_{12}$ aryl or —CO—$C_1$-$C_{18}$ alkyl, and $R^9 = Z - R^{10} - Z - R^{11}$,

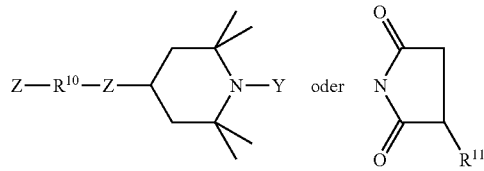

wherein
Z = a divalent functional group such as C(O)O, NH or NHCO
$R^{10}$ = a divalent organic radical such as $(CH_2)_l$ with $l = 0$ to 12, C=CH-Ph-OCH₃

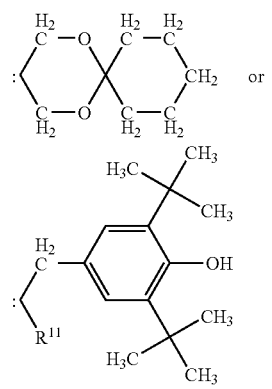

$R^{11}$ = H or $C_1$-$C_{20}$ alkyl.

This gives the following formulae:

(Va)

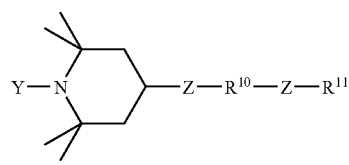

(Vb)

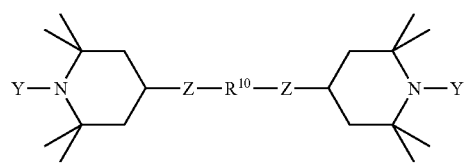

(Vc)

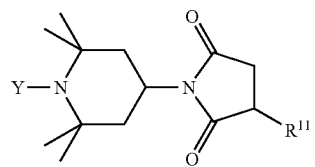

wherein Y, Z, $R^{10}$ and $R^{11}$ have the above-mentioned meaning.

HALS systems according to the following formulae are preferably used:

(Vd)

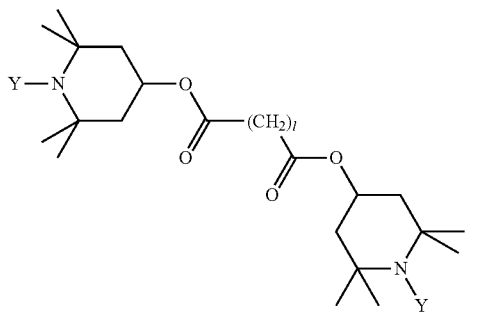

wherein Y and l have the above-mentioned meaning, and (Ve)

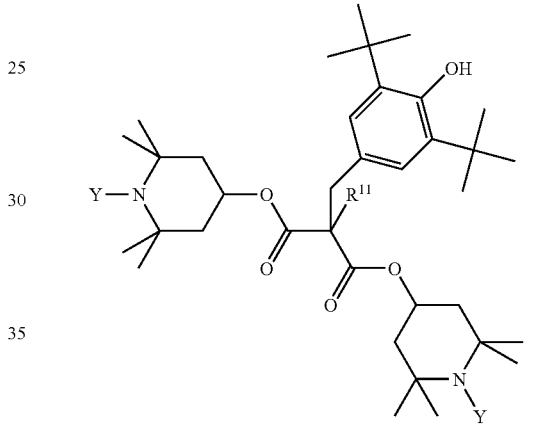

wherein Y and $R^{11}$ have the above-mentioned meaning.

HALS systems according to formulae (Vf) and (Vg) are particularly preferred (Vf)

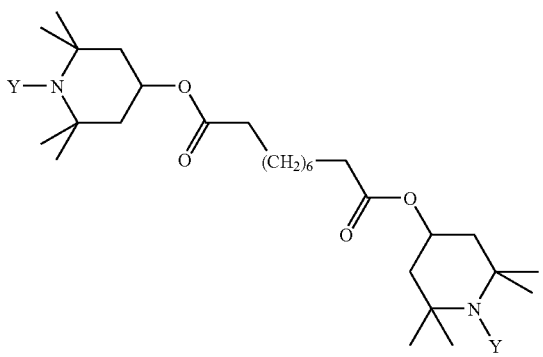

with Y=$OC_8H_{17}$ (bis(1-octyloxy-2,2,6,6-tetramethyl-4-piperidyl) sebacic acid ester; Tinuvin® 123 from Ciba Speciality Chemicals) and (Vg)

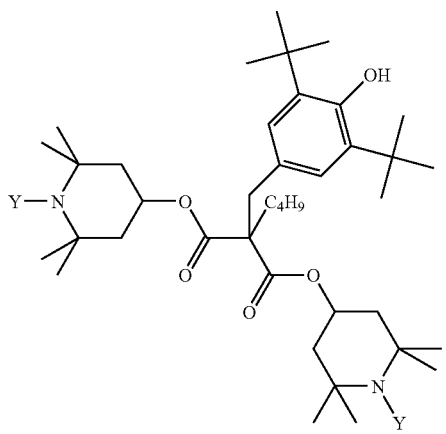

with Y=CH$_3$ ((3,5-ditert.-butyl-4-hydroxybenzyl)-butyl malonic acid-bis-(1,2,2,6,6-pentamethyl-4-piperidyl) ester; Tinuvin® 144 from Ciba Speciality Chemicals).

Component E

Component E according to the invention are preferably all of the flow control agents that facilitate good wetting of the coating formulation on the surface of the second layer and also a visually attractive surface of the first layer formed on curing of the coating formulation. Janos Hajas "Levelling Additives" in Additives in Coatings, Johan Beileman (ed.), Wiley-VCH Verlag GmbH, Weinheim 2000, pp 164-179 gives an overview of common flow control agents. For example and preferably, the flow control agent BYK® 300 from BYK Chemie is used.

Component F

Component F according to the invention are solvents or solvent mixtures which are compatible to an extent with the second layer and help facilitate dispersion, application and evaporation of the coating formulation such that after UV curing of the coating formulation to the actual first layer, a multi-layer product with high transparency and low haze is obtained. These can be for example and preferably alkanes, alcohols, esters, ketones or mixtures of those named. Alcohols (with the exception of methanol), acetic acid ethyl ester and butanone can particularly preferably be used. Very particularly preferred are solvents or solvent mixtures selected from at least one of the groups consisting of diacetone alcohol (CH$_3$)$_2$C(OH)CH$_2$C(=O)CH$_3$, acetic acid ethyl ester, methoxypropanol and butanone.

Component G

Component G is at least one photoinitiator selected from the group consisting of acylphosphine oxide derivatives and α-aminoalkylphenone derivatives according to formula VI (acylphosphine oxides) or VII (α-aminoalkylphenone), (VI)

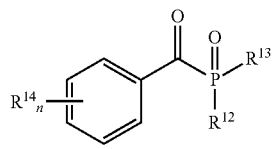

(VII)

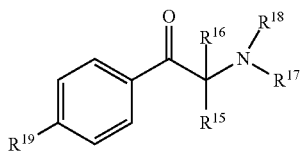

wherein
R$^{12}$=C$_1$-C$_{30}$ alkyl, C$_5$ to C$_6$ cycloalkyl optionally substituted by C$_1$ to C$_4$ alkyl, and/or chlorine, bromine, C$_6$ to C$_{20}$ aryl, C$_6$ to C$_{20}$ aryloxy or C$_7$ to C$_{12}$ aralkyl, preferably phenyl, CH$_2$CH(CH$_3$)CH$_2$C(CH$_3$)$_3$ or

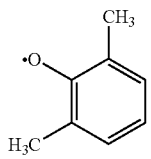

R$^{13}$=C$_1$-C$_{30}$ alkyl, C$_1$-C$_{30}$ alkoxy, C$_5$ to C$_6$ cycloalkyl optionally substituted by C$_1$ to C$_4$ alkyl, C$_1$ to C$_4$ alkoxy, C$_1$ to C$_4$ acyl and/or chlorine, bromine, C$_6$-C$_{20}$ aryl, C$_6$ to C$_{20}$ aryloxy, C$_7$ to C$_{21}$ aroyl or C$_7$ to C$_{12}$ aralkyl, preferably OCH$_2$CH$_3$, phenyl

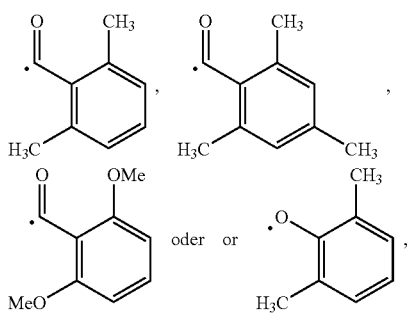

R$^{14}$=C$_1$ to C$_4$ alkyl, C$_1$ to C$_4$ alkoxy, preferably CH$_3$ or OCH$_3$
n=0 to 5, preferably 0, 2 or 3,
R$^{15}$, R$^{16}$, R$^{17}$ and R$^{18}$ independently of one another are C$_1$-C$_{30}$ alkyl, optionally C$_5$ to C$_6$ cycloalkyl optionally substituted by C$_1$ to C$_4$ alkyl, and/or chlorine, bromine, C$_6$ to C$_{20}$ aryl or C$_7$ to C$_{12}$ aralkyl, preferably R$^{15}$ is CH$_2$Ph or CH$_3$, R$^{16}$=CH$_2$CH$_3$ or CH$_3$, R$^{17}$=CH$_3$ and R$^{18}$=CH$_3$, and wherein the radicals R$^{17}$ and R$^{18}$ can also be linked to a ring so that the nitrogen N shown in formula (VII) is part of a heterocyclic ring system preferably part of morpholine

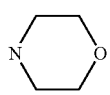

R$^{19}$=C$_1$ to C$_{30}$ alkoxy, C$_1$ to C$_{30}$ alkylthio, C$_1$ to C$_{30}$ dialkylamino, C$_5$ to C$_6$ cycloalkyl optionally substituted by C$_1$ to C$_4$ alkyl, and/or chlorine, bromine, wherein the C atoms of the ring can also be substituted by heteroatoms such as N, O or S, preferably methylthio or

The following are preferably used as photoinitiators according to component G: bis(2,4,6-trimethylbenzoyl)phenyl phosphine oxide (Irgacure® 819 from Ciba Speciality Chemicals), (2,4,6-trimethylbenzoyl)diphenyl phosphine oxide (Lucirin® TPO Solid from BASF AG), bis(2,6-dimethylbenzoyl)(2,4,4-trimethylpentyl) phosphine oxide, bis(2,6-dimethoxybenzoyl)(2,4,4-trimethylpentyl) phosphine oxide, benzoylphosphonic acid bis(2,6-dimethylphenyl)ester (Lucirin® 8728 from BASF AG), 2,4,6-trimethylbenzoylethoxyphenyl phosphine oxide (Lucirin® TPO-L from BASF AG), 2-benzyl-2-(dimethylamino)-1-4-morpholino-phenyl)-1-butanone (Irgacure® 369 from Ciba Speciality Chemicals) and 2-methyl-1-[4-(methylthio)phenyl]-2-morpholino-1-propanone (see formula VIIa; Irgacure® 907 from Ciba Speciality Chemicals).

(VIIa)

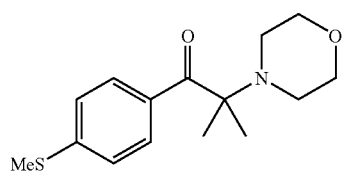

Bis(2,4,6-trimethylbenzoyl)phenyl phosphine oxide (Irgacure® 819 from Ciba Speciality Chemicals), 2,4,6-trimethylbenzoylethoxyphenyl phosphine oxide (Lucirin® TPO-L from BASF AG) and 2-methyl-1-[4-(methylthio)phenyl]-2-morpholino-1-propanone (Irgacure® 907 from Ciba Speciality Chemicals) are particularly preferably used.

The photoinitiators according to the invention have a high photochemical reactivity and an absorption band in the near UV range of >300 nm, particularly preferably λX>350 nm.

Also suitable are mixtures of these photoinitiators according to formulae (VI) and (VII) with one another and mixtures of the photoinitiators according to formulae (VI) and (VII) with other generally known photoinitiators such as for example α-hydroxyalkylphenones or phenylacetophenones. Mixtures of bis(2,6-dimethoxy-benzoyl)(2,4,4-trimethylpentyl) phosphine oxide and (1-hydroxycyclohexyl)phenylmethanone, preferably in a ratio of 25:75 (Irgacure® 1800 from Ciba Speciality Chemicals), or a mixture of bis(2,6-dimethoxybenzoyl)-2,4,4-trimethylpentyl) phosphine oxide and 2-hydroxy-2-methyl-1-phenyl-1-propanone, preferably in a ratio of 25:75 (Irgacure® 1700 from Ciba Speciality Chemicals) are preferably used.

Structure of the Second Layer (S2)

Thermoplastic polymers of the second layer according to the invention are polycarbonate, polyester carbonate, polyesters (such as for example polyalkylene terephthalate), polyphenylene ethers, graft copolymers (such as for example ABS) and mixtures thereof.

The second layer is preferably polycarbonate, in particular homopolycarbonate copolycarbonate and/or thermoplastic polyester carbonate.

The thermoplastic polymers preferably have mean molecular weights $\overline{M}_w$ of 18,000 to 40,000, preferably 22,000 to 36,000 and in particular 24,000 to 33,000, determined by measuring the relative solution viscosity in dichloromethane or in mixtures of equal quantities by weight of phenol/o-dichlorobenzene calibrated by light scattering.

"Schnell, Chemistry and Physics of Polycarbonates, Polymer Reviews, vol. 9, Interscience Publishers, New York, London, Sydney 1964" and "D. C. PREVORSEK, B. T. DEBONA and Y. KESTEN, Corporate Research Center, Allied Chemical Corporation, Moristown, N.J. 07960, "Synthesis of Poly(ester)carbonate Copolymers" in Journal of Polymer Science, Polymer Chemistry Edition, vol. 19, 75-90 (1980)" and "D. Freitag, U. Grigo, P. R. Müller, N. Nouvertne, BAYER AG, 'Polycarbonates' in Encyclopedia of Polymer Science and Engineering, vol. 11, second edition, 1988, pages 648-718", and finally "Dres. U. Grigo, K. Kircher and P. R. Müller 'Polycarbonate' in Becker/Braun, Kunststoff-Handbuch, vol. 3/1, Polycarbonate, Polyacetale, Polyester, Celluloseester, Carl Hanser Verlag Munich, Vienna 1992, pages 117-299", for example, should be referred to for the production of polycarbonates.

The production of polycarbonates takes place preferably according to the phase interface process or the melt transesterification process and is described in the following for example on the phase interface process.

Compounds to be preferably used as starting compounds are bisphenols of the general formula (VIII)

wherein R is a divalent organic radical with 6 to 30 carbon atoms which contains one or more aromatic groups.

Examples of such compounds are bisphenols which belong to the group of dihydroxydiphenyls, bis(hydroxyphenyl)alkanes, indane bisphenols, bis(hydroxyphenyl)ethers, bis(hydroxyphenyl) sulphones, bis(hydroxyphenyl) ketones and α, α'-bis(hydroxyphenyl)-diisopropylbenzenes.

Particularly preferred bisphenols which belong to the afore-mentioned compound groups are bisphenol A, tetraalkyl bisphenol A, 4,4-(meta-phenylene diisopropyl)diphenol (bisphenol M), 4,4-(para-phenylene diisopropyl)diphenol, 1,1-bis-(4-hydroxyphenyl)-3,3,5-trimethyl cyclohexane (BP-TMC) and optionally mixtures thereof.

Preferably the bisphenol compounds to be used according to the invention are reacted with carbon dioxide compounds, in particular phosgene, or in the melt transesterification process with diphenyl carbonate or dimethyl carbonate.

Polyester carbonates are preferably obtained by reaction of the already named bisphenols, at least one aromatic dicarboxylic acid and optionally carbon dioxide equivalents. Suitable aromatic dicarboxylic acids are for example phthalic acid, terephthalic acid, isophthalic acid, 3,3'- or 4,4'-diphenyl dicarboxylic acid and benzophenone dicarboxylic acids. Part, up to 80 mol %, preferably 20 to 50 mol % of the carbonate groups in the polycarbonates can be replaced by aromatic dicarboxylic acid ester groups.

Inert organic solvents used in the phase interface process are for example dichloromethane, the various dichloroethanes and chloropropane compounds, tetrachloromethane, trichloromethane, chlorobenzene and chlorotoluene, preferably chlorobenzene or dichloromethane or mixtures of dichloromethane and chlorobenzene are used.

The phase interface reaction can be accelerated by catalysts such as tertiary amines, in particular N-alkylpiperidine or onium salts. Tributylamine, triethylamine and N-ethyl piperidine are preferably used. In the case of the melt transesterification process, the catalysts named in DE-A 4 238 123 are preferably used.

Controlled branching of the polycarbonates can be achieved by using small quantities of splitter. Some suitable splitters are: phloroglucinol, 4,6-dimethyl-2,4,6-tri-(4-hydroxyphenyl)-heptene-2; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-bis(4-hydroxyphenyl)-cyclohexyl]-propane; 2,4-bis-(4-hydroxyphenyl-isopropyl)-phenol; 2,6-bis-(2-hydroxy-5'-methyl-benzyl)-4-methylphenol; 2-(4-hydroxyphenyl)-2-(2,4-dihydroxyphenyl)-propane; hexa-(4-(4-hydroxyphenyl-isopropyl)-phenyl)-orthoterephthalic acid ester; tetra-(4-hydroxyphenyl)-methane; tetra-(4-(4-hydroxyphenyl-isopropyl)-phenoxy)-methane; α, α',α"-tris-(4-hydroxyphenyl)-1,3,5-triisopropyl benzene; 2,4-dihydroxybenzoic acid; trimesic acid; cyanuric chloride; 3,3-bis-(3-methyl-4-hydroxyphenyl)-2-oxo-2,3-dihydroindole; 1,4-bis-(4',4"-dihydroxytriphenyl)-methyl)-benzene and in particular: 1,1,1-tri-(4-hydroxyphenyl)-ethane and bis-(3-methyl-4-hydroxyphenyl)-2-oxo-2,3-dihydroindole.

The 0.05 to 2 mol %, based on diphenols used, of splitters or mixtures of splitters, can be used together with the diphenols or even added at a later stage of the synthesis.

Preferably phenols such as phenol, alkylphenols such as cresol and 4-tert.-butylphenol, chlorophenol, bromophenol, cumylphenol or mixtures thereof can be used as chain terminators in quantities of 1-20 mol %, preferably 2-10 mol % per mole bisphenol. Phenol, 4-tert.-butylphenol or cumylphenol are preferred.

Chain terminators and splitters can be added to the syntheses separately or also together with the bisphenol.
production of the polycarbonates according to the melt transesterification process is described for example in DE-A 4238 123.

Polycarbonates preferred according to the invention for the second layer of the multi-layer product according to the invention are the homopolycarbonate based on bisphenol A, the homopolycarbonate based on 1,1-bis-(4-hydroxyphenyl)-3,3,5-trimethylcyclohexane and the copolycarbonates based on the two monomers bisphenol A and 1,1-bis-(4-hydroxyphenyl)-3,3,5-trimethylcyclohexane.

The homopolycarbonate based on bisphenol A is particularly preferred.

The polycarbonate can contain stabilisers. Suitable stabilisers are for example phosphines, phosphates or Si-containing stabilisers and other compounds described in EP-A 0 500 496. Triphenylphosphites, diphenylalkylphosphites, phenyldialkylphosphites, tris-(nonylphenyl)phosphite, tetrakis-(2,4-di-tert.-butylphenyl)-4,4'-biphenylene diphosphonite and triarylphosphite can be named for example. Particularly preferred are triphenylphosphine and tris-(2,4-di-tert.-butylphenyl) phosphite.

Furthermore, the polycarbonate-containing second layer of the multi-layer product according to the invention can contain 0.01 to 0.5 wt. % of the esters or partial esters of mono- or hexavalent alcohols, in particular glycerol, pentaerythritol or Guerbet alcohols.

Monovalent alcohols are for example stearyl alcohol, palmityl alcohol and Guerbet alcohols.

A divalent alcohol is for example glycol.

A trivalent alcohol is for example glycerol.

Tetravalent alcohols are for example pentaerythritol and mesoerythritol.

Pentavalent alcohols are for example arabitol, ribitol and xylitol.

Hexavalent alcohols are for example mannitol, glucitol (sorbitol) and dulcitol.

The esters are preferably the monoesters, diesters, triesters, tetraesters, pentaesters and hexaesters or mixtures thereof, in particular statistical mixtures, of saturated aliphatic $C_{10}$ to $C_{36}$ monocarboxylic acids and optionally hydroxymonocarboxylic acids, preferably with saturated, aliphatic $C_{14}$ to $C_{32}$ monocarboxylic acids and optionally hydroxyl-monocarboxylic acids.

The commercially obtainable fatty acid esters, in particular of pentaerythritol and glycerol, can due to production contain <60% different partial esters.

Saturated, aliphatic monocarboxylic acids with 10 to 36 C atoms are for example capric acid, lauric acid, myristic acid, palmitic acid, stearic acid, hydroxystearic acid, arachidic acid, behenic acid, lignoceric acid, cerotic acid and montanic acids.

Preferred saturated aliphatic monocarboxylic acids with 14 to 22 C atoms are for example myristic acid, palmitic acid, stearic acid, hydroxystearic acid, arachidic acid and behenic acid.

Particularly preferred are saturated aliphatic monocarboxylic acids such as palmitic acid, stearic acid and hydroxystearic acid.

The saturated aliphatic $C_{10}$ to $C_{36}$ carboxylic acids and the fatty acid esters are either known as such in the literature or producible by processes known in the literature. Examples of pentaerythritol fatty acid esters are those of the particularly preferred monocarboxylic acids named above. Particularly preferred are esters of pentaerythritol and glycerol with stearic acid and palmitic acid. Particularly preferred are also esters of Guerbet alcohols and glycerol with stearic acid and palmitic acid and optionally hydroxystearic acid.

The multi-layer product according to the invention can comprise other layers, in particular a further UV protective layer (S3) which contains a UV stabiliser according to formula (IV). The sequence of layers is in this case (S1)-(S2)-(S3) and layers (S1) and (S3) can have the same or different compositions.

The multi-layer products according to the invention can contain organic dyes, inorganic coloured pigments, fluorescent dyes and particularly preferably optical brighteners.

One embodiment of the invention a coating obtainable from:
A) one or more aliphatic polymer precursors selected from at least one of the groups consisting of
   A.1) aliphatic oligomers containing urethane bonds or ester bonds with at least two acrylate functions per molecule or mixtures of corresponding oligomers and
   A.2) aliphatic reactive diluents with at least two acrylate groups per molecule or mixtures of corresponding reactive diluents,
B) one or more fine-particle inorganic compounds which are preferably present in the coating formulation dispersed agglomerate-free,
C) at least one organic UV absorber selected from the group consisting of triazine derivatives and biphenyltriazine derivatives, preferably at least one UV absorber of the biphenyltriazine derivatives,
D) optionally one or more radical scavengers of the HALS class
E) optionally one or more flow control agents
F) optionally one or more solvents, and
G) at least one special photoinitiator selected from the group consisting of acylphosphine oxide derivatives and α-aminoalkylphenone derivatives which are preferably distinguished by a high photochemical reactivity and an absorption band in the near UV range of >300 nm, particularly preferably λ>350 nm,
which is suitable for the production of at least one layer of a multi-layer product.

An additional embodiment of the invention is also a process for the production of a multi-layer product wherein (i) in a first step, the first layer SI is applied in the form of a coating formulation to the second layer S2 in which this is preferably a plastic molding of any shape produced from the thermoplastic polymer according to S2 by means of injection moulding or extrusion, and
(ii) in a second step, the coating formulation of the first layer is cured.

Preferably, in the first step (i) the coating formulation is applied to the surface of the second layer by flow coating, dipping, spraying, roll coating or spin coating and then evaporating at room temperature and/or elevated temperature (preferably at 20-200° C., particularly preferably at 40-120° C.). The surface of the second layer can be pre-treated by cleaning or activating.

Preferably, in the second step (ii) curing of the first layer is carried out by means of UV light wherein a mercury vapour lamp or even correspondingly doped variants (for example with gallium or iron) are preferably used as the UV light source.

Other embodiments of the invention include the production of the multi-layer products and the products constructed of the multi-layer products. Also, the subject matter of the present invention is the use of afore-mentioned multi-layer products, in particular for external applications with constantly high requirements regarding the visual impression, such as for example glazing.

The present invention also includes multi-layer products which contain as layer S2, a plastic molding which is produced preferably from thermoplastic polymer by means of injection molding or extrusion and is coated with the coating according to SI and optionally with an additional layer, S3. This multi-layer product is, for example, a glazing product such as architectural glazing, automotive glazing, spotlight glazing, lenses or helmet visors.

EXAMPLES

Component AB:

Component AB-1: Nanocryl ® xp21/1372 from Hanse Chemie AG containing Viaktin ® 6160, an aliphatic urethane hexaacrylate from Vianova Resin, and a solid content of 40 wt. % fine-particle $SiO_2$ with a mean particle size ($d_{50}$) of 23.5 nm and a (($d_{90}$-$d_{10}$)/$d_{50}$) of 0.66)

Component AB-2: Nanocryl ® xp21/1468 (Hanse Chemie AG) containing Ebecryl ® 4858, an aliphatic urethane diacrylate from Cytec Surface Specialities, and a solid content of 40 wt. % fine-particle $SiO_2$ (dm = 24.3 nm; ($d_{90}$-$d_{10}$)/$d_{50}$ = 0.43)

Component AB-3: Nanocryl ® xp21/1930 (Hanse Chemie AG) containing Ebecryl ® 810, a polyester tetraacrylate from Cytec Surface Specialities, and a solid content of 50 wt. % fine-particle $SiO_2$ ($d_{50}$ = 27.7 nm; ($d_{90}$-$d_{10}$)/$d_{50}$) = 0.61

Component AB-4: Nanocryl ® xp21/1447 (Hanse Chemie AG); Laromer ® 8987, an aliphatic urethane triacrylate with 30% 1,6-hexanediol diacrylate as reactive diluent from BASF AG, and a solid content of 40 wt. % fine-particle $SiO_2$ ($d_{50}$ = 24.1 nm; ($d_{90}$-$d_{10}$)/$d_{50}$) = 0.49)

Component AB-5: Nanocryl ® xp21/2344 (Hanse Chemie AG); Roskydal ® 2308, an aliphatic urethane triacrylate with 20% 1,6-hexanediol diacrylate as reactive diluent from Bayer MaterialScience AG, further diluted with 1,6-hexanediol diacrylate (HDDA) to 25% HDDA, and a solid content of 50 wt. % fine-particle $SiO_2$ ($d_{50}$ = 24.0 nm; ($d_{90}$-$d_{10}$)/$d_{50}$) = 0.58

Component AB-6: Nanocryl ® xp21/3032 (Hanse Chemie); Ebecryl ® 4858, an aliphatic urethane diacrylate from Cytec Surface Specialities, diluted with tricyclodecane dimethanol diacrylate as reactive diluent to a ratio of 70 to 30, and a solid content of 40 wt. % fine-particle $SiO_2$ ($d_{50}$ = 24.1 nm; ($d_{90}$-$d_{10}$)/$d_{50}$) = 0.47)

Component C: UV absorber CGL479 from Ciba Speciality Chemicals

Component D:

Component D-1: HALS system Tinuvin ® 123 from Ciba Speciality Chemicals
Component D-2: HALS system Tinuvin ® 144 from Ciba Speciality Chemicals
Component E: Flow control agent BYK ® 300 from BYK Chemie
Component F:

Component F-1: Diacetone alcohol
Component F-2: Methoxypropanol
Component G:

Component G-1: Irgacure ® 184 from Ciba Speciality Chemicals (reference)
Component G-2: Irgacure ® 819 from Ciba Speciality Chemicals
Component G-3: Irgacure ® 1800 from Ciba Speciality Chemicals
Component G-4: Darocure ® 1173 from Ciba Speciality Chemicals (reference)
Component G-5: Irgacure ® 651 from Ciba Speciality Chemicals (reference)
Component G-6: Lucirin ® TPO-L from BASF AG
Component G-7: Irgacure ® 907 from Ciba Speciality Chemicals Test Procedure (General Description):
a) Production of the Coating Formulation:

The quantity given in Table 1 in the column headed "Coating basic formulation" of the named type of component AB was dissolved in the given quantity of component F-1 or F-2. The solid content was then determined experimentally using the solid tester MA40 from Satorius as described below.

Experimental determination of the solid content with the solid test MA40 from Satorius:

A quantity of approx. 2 g of the coating solution produced is placed in an aluminium dish and the exact weight m (initial weight before the heating phase) determined. The coating solution is then heated to 105° C. and kept at 105° C. to constant weight. When constant weight has been reached, the weight m (final weight at constant weight) is read off. From quotient m (final weight at constant weight) to m (initial weight before the heating phase) is obtained the experimentally determined solid content.

To the quantity of coating solution reduced by the quantity taken for determination of the solid are added consecutively:

2.2 wt. % (based on the experimentally determined solid content) of component C, optionally 1 wt. % (based on the experimentally determined solid content) of component D (see Table 1, column headed "UV stabiliser package"),
5 wt. % (based on the quantity of component AB used) of component G wherein the type and composition with mixtures can be taken from Table 1, and
0.5 wt. % (based on the coating solution consisting of components AB and F) of component E with stirring and completely dissolved.

b) Coating of the Substrates with the UV-Curing Coating Formulation:

The injection-moulded polycarbonate (PC) sheets used in the optical grade of Makrolon® 2808 (Bayer MaterialScience AG; medium-viscosity bisphenol A-polycarbonate, MVR 10 g/10 min according to ISO 1133 at 300° C. and 1.2 kg, without UV stabilisation), size 10×15×0.32 cm, were heat-treated for 1 h at 120° C., rinsed with isopropanol, evaporated, UV-pretreated (with a laboratory UV radiator KTR 2061 from Hackemack; web speed 3 m/min and with a UV dose (Hg lamp) of 1.7 J/cm², measured with an eta plus UMD-1/dosimeter) and then treated with ionised air. The UV-curing coating formulation of a) was then applied in the flow coating process under the conditions as described in Table 1, column headed "Curing conditions". After the wash off time the coated sheets are cured twice at a web speed of 4 m/min in a laboratory UV radiator KTR 2061 from Hackemack at a UV dose (Hg lamp) of 2.6 J/cm², measured with an eta plus UMD 1 dosimeter. The thickness of the transparent coating thus obtained was determined by means of an Eta SD 30 from Eta Optik GmbH (for values see Table 1, column headed "Layer thickness").

c) Testing of the Adhesion of the UV-Curing Protective Layer to the PC Substrate:

The following adhesion tests were carried out:
(a) adhesive tape tear-off (adhesive tape 3M 898 used) with and without cross-hatch adhesion (as in ISO 2409 or ASTM D 3359), and
(b) adhesive tape tear-off after 10 days' storage in approx. 65° C. hot water (as in ISO 2812-2 and ASTM 870-02).

In reference examples 1, 2 and 8 in which the surface of the coating layer was still tacky after UV radiation (see column headed Adhesion multilayer structure in Table 1), the adhesion test was not necessary.

d) Measurement of the Abrasion Resistance and Determination of the Relative Taber Value:

The initial haze value of the PC sheet coated with the UV-cured first layer (obtained from b)) was first of all determined according to ASTM D 1003 using a Haze Gard Plus from Byk-Gardner. The coated side of the sample was then scratched by means of a Taber Abraser model 5131 from Erichsen according to ISO 52347 or ASTM D 1044 using the CS10F wheels (type II; colour pink). A Δhaze value (sample) was established by determining the end haze value after 1000 rotations. Directly thereafter, a PC sheet coated with siloxane coating SHP401/AS4000 from GE Bayer Silicons was scratched under the same conditions, a Δhaze value (reference) being obtained. From this is obtained the relative Taber value given in Table 1 for the multi-layer product of $$\text{relative Taber value} = \frac{\Delta\text{haze value (sample)}}{\Delta\text{haze value (reference)}}$$

Within the meaning according to the invention, the first layer should have a sufficiently high scratch resistance. This criterion is achieved within the meaning according to the invention if the relative Taber value is less than or equal to two.

In Examples 1, 2 and 8 in which the surface of the coating layer was still tacky after UV radiation (see column headed Abrasion resistance rel. Taber value), this test was not necessary.

Determination of the Extinction of the UV-Cured Coating:

Using a Cary 50 UV-V is spectrophotometer from Varian Inc., the UV spectrum of the coating, thus the first layer of the multi-layer product, was established using the uncoated polycarbonate sheet as a background spectrum for measurement of the coated polycarbonate sheet, thus the multi-layer product. The extinction value, measured at a wavelength of 340 nm, for the first layer is listed in Table 1 together with the layer thickness of this first layer at exactly the extinction measuring point.

Within the meaning according to the invention, it was the object to achieve an extinction of ≥1.5 for the first layer measured at 340 nm and layer thicknesses of approx. 5 μm.

Results:

The results are shown in Table 1.

The compositions of reference examples 1, 2 and 8 gave tacky layers, the other compositions of (reference) examples 3-7 and 9-32 fulfil the adhesion test carried out, i.e. there was no tear-off of the coating of any kind (rating "0" according to ISO 2409 or "5B" according to ASTM D 3359).

Reference examples 1, 2, 8, 9, 10, 13, 14 and 19 do not fulfil the requirement on the scratch resistance and abrasion resistance of the first layer of the multi-layer product. There is an efficient crosslinking or curing of the first layer resulting in a high scratch resistance and abrasion resistance if the multi-layer product after 1000 rotations with CS10F wheels (Taber Abraser test) exhibits an increase in haze in the form of a relative Taber value of ≤2, the siloxane-based hardcoat (AS4000 from GE Bayer Silicons) being regarded as reference regarding abrasion resistance. Generally known photoinitiators such as 2,2-dimethoxy-2-phenylacetophenone (Irgacure® 651 from Ciba Speciality Chemicals; component G5) or even the representatives of the α-hydroxyalkylphenone class, such as for example 1-hydroxycyclohexyl-phenyl ketone (Irgacure® 184 from Ciba Speciality Chemicals, component G1) and α-hydroxy-α,α-dimethylacetophenone (Darocur®1173 from Ciba Speciality Chemicals; component G4) alone do not with the coating formulations used here with high UV filter action (extinction≥1.5 for the first layer measured at 340 nm and layer thicknesses of approx. 5 μm) lead to an efficient curing (reference examples 1, 2, 8, 9, 10, 13, 14 and 19).

The object according to the invention regarding a relative abrasion value of the sample (relative Taber values of ≤2) compared with a standard (siloxane-based hardcoat (AS4000 from GE Bayer Silicons) determined in accordance with the Taber Abraser method according to ISO 52347 or ASTM D 1044 and at the same time a high UV filter action (extinction≥1.5 for the first layer measured at 340 nm and layer thicknesses of approx. 5 μm) is fulfilled by the multi-layer products according to the invention (Examples 3-7, 11, 12, 15-18 and 20-32).

TABLE 1

| No. | Coating base formulation[1] | UV stabiliser package[2] | Photoinitiator[3] | Curing conditions[4] | Layer thickness[5] | Adhesion multi-layer structure[6] | Abrasion resistance rel. Taber value[7] | Extinction at 340 nm @ layer density thickness[8] |
|---|---|---|---|---|---|---|---|---|
| 1 (ref.) | 12 g AB-1; | 2.2% C | 5% G-1 | H1 | 2.3-5.6 μm | — | tacky | — |
| 2 (ref.) | 22 g F-1 & 0.18 g E | 2.2% C & 1% D-1 | | | 2.1-5.2 μm | — | tacky | — |
| 3 | | 2.2% C & 1% D-1 | 5% (G-1/G-2 (80/20)) | | 2.2-5.3 μm | OK | 1.5 | 2.0 @ 6.4 μm |

TABLE 1-continued

|  | First layer | | | | | | Abrasion resistance | Extinction at 340 nm |
| --- | --- | --- | --- | --- | --- | --- | --- | --- |
| No. | Coating base formulation[1] | UV stabiliser package[2] | Photoinitiator[3] | Curing conditions[4] | Layer thickness[5] | Adhesion multi-layer structure[6] | rel. Taber value[7] | @ layer density thickness[8] |
| 4 |  |  | 5% G-2 |  | 2.1-5.9 μm | OK | 0.9 | 2.6 @ 6.4 μm |
| 5 |  | 2.2% C | 5% G-3 |  | 2.5-4.4 μm | OK | 1.4 | 2.3 @ 7.3 μm |
| 6 |  | 2.2% C & 1% D-1 |  |  | 2.8-4.8 μm | OK | 1.1 | 2.1 @ 6.2 μm |
| 7 |  | 2.2% C & 1% D-1 | 5% (G-4/G-2 (80/20)) |  | 2.2-5.7 μm | OK | 1.5 | 2.0 @ 5.6 μm |
| 8 (ref.) |  |  | 5% G-4 |  | 1.9-5.4 μm | — | tacky | — |
| 9 (ref.) |  |  | 5% G-5 |  | 2.1-4.9 μm | OK | >2.0 | 1.7 @ 4.8 μm |
| 10 (ref.) |  |  | 5% (G-1/G-5 (80/20)) |  | 2.2-6.0 μm | OK | >2.0 | 1.5 @ 4.8 μm |
| 11 |  |  | 5% (G-1/G-6 (80/20)) |  | 2.2-5.4 μm | OK | 2 | 1.9 @ 6.2 μm |
| 12 |  |  | 5% (G-1/G-7 (80/20)) |  | 2.9-5.4 μm | OK | 1.5 | 2.1 @ 5.8 μm |
| 13 (ref.) | 6 g AB-2; | 2.2% C | 5% G-1 | H2 | 1.1-3.2 μm | OK | >2.0 | 1.9 @ 3.0 μm |
| 14 (ref.) | 11 g F-1 & | 2.2% C & | 5% G-4 |  | 0.9-3.3 μm | OK | >2.0 | 2.0 @ 3.2 μm |
| 15 | 0.09 g E | 1% D-1 | 5% (G-1/G-6 (80/20)) |  | 1.3-3.2 μm | OK | 1.1 | 2.4 @ 3.9 μm |
| 16 |  |  | 5% G-3 |  | 1.4-2.6 μm | OK | 0.7 | 1.8 @ 2.8 μm |
| 17 |  |  | 5% G-2 |  | 1.3-3.9 μm | OK | 0.6 | 2.0 @ 3.2 μm |
| 18 |  |  | 5% (G-1/G-7 (80:20)) |  | 1.4-2.4 μm | OK | 1.9 | 1.9 @ 2.8 μm |
| 19 (ref.) | 6 g AB-3; | 2.2% C & | 5% G-1 | H3 | 2.4-4.5 μm | OK | >2.0 | 2.5 @ 5.4 μm |
| 20 | 11 g F-2 & | 2.2% C | 5% (G-1/G-6 |  | 4.1-7.1 μm | OK | 0.7 | 1.9 @ 6.5 μm |
| 21 | 0.09 g E | 2.2% C & 1% D-1 | (80/20)) |  | 4.2-8.0 μm | OK | 1.5 | 2.3 @ 9.7 μm |
| 22 |  | 2.2% C & 1% D-2 |  |  | 5.1-7.6 μm | OK | 0.4 | 2.1 @ 8.7 μm |
| 23 |  | 2.2% C |  |  | 5.4-7.9 μm | OK | 0.6 | 2.2 @ 9.3 μm |
| 24 |  | 2.2% C & 1% D-1 | 5% G-3 |  | 5.0-7.9 μm | OK | 0.6 | 2.3 @ 9.9 μm |
| 25 |  | 2.2% C & 1% D-2 |  |  | 5.2-7.8 μm | OK | 0.4 | 2.2 @ 9.0 μm |
| 26 | 7.7 g AB-4; | 2.2% C & 1% D-1 | 5% G-3 | H4 | 2.5-5.0 μm | OK | 0.9 | 2.0 @ 6.2 μm |
| 27 | 11 g F-1 & 0.09 g E |  | 5% (G-1/G-6 (80/20)) |  | 2.7-5.1 μm | OK | 0.9 | 2.4 @ 7.7 μm |
| 28 | 13.5 g AB-5; | 2.2% C & 1% D-1 | 5% (G-1/G-6 (80/20)) | H5 | 1.8-3.6 μm | OK | 0.5 | 1.7 @ 4.9 μm |
| 29 | 24.8 F-1 & 0.21 g E |  | 5% G-3 |  | 1.7-4.5 μm | OK | 0.7 | 1.5 @ 4.5 μm |
| 30 |  |  | 5% G-2 |  | 1.7-5.3 μm | OK | 0.5 | 2.0 @ 5.3 μm |
| 31 | 12 g AB-6; | 2.2% C & 1% D-1 | 5% (G-1/G-6 (80/20)) | H6 | 2.0-3.2 μm | OK | 0.8 | 1.8 @ 4.1 μm |
| 32 | 22 g F-1 & 0.18 g E |  | 5% G-3 |  | 2.0-3.2 μm | OK | 0.6 | 1.8 @ 4.1 μm |

Ref. = reference (comparative) example (1) Coating base formulation (still without UV protective package and photoinitiator). In Examples 28-30 with component AB-5, no UV pre-treatment of the substrate (Makrolon® 2808) was carried out before coating.

(2) Data in wt. % based on the experimentally determined solid content of the coating solution (see general example description).

(3) Data in wt.-% based on the quantity of Nanocryl (component AB) used.

(4) Curing conditions of the first layer after application to the second layer.
H1; H2; H4; H5 and H6 wash off for 30 min at RT; 30 min at 110° C. and UV-cured with an Hg lamp (web speed 2×4 m/min; UV dose 2.6 J/cm$^2$); H3 wash off for 30 min at RT; 30 min at 50° C. and UV-cured with an Hg lamp (web speed 2×4 m/min; UV dose 2.6 J/cm$^2$).

(5) Layer thickness measured in direction of flow at the top and at the bottom (each approximately 2 cm from the edge of the sheet) with an Eta SD 30 from Eta Optik GmbH.

(6) Adhesion test for the multi-layer structure (a) tape peel test with and without cross-hatch in accordance with ISO 2409 or ASTM D3359 and (b) tape peel test on the cross-hatch after immersion in water of the sample in 65+/−2° C. hot water in accordance with ISO 2812-2 or ASTM 870-02 (the test is passed if on the 10$^{th}$ day of immersion in water no delamination according to the tape test occurs on the cross-hatch; "OK" means that in both tests (a) and (b) no delamination occurs, i.e. in test a) rating "0" according to ISO 2409 or "5B" according to ASTM D 3359).

(7) Taber Abraser test according to ISO 52347 or ASTM D 1044, 1000 rotations each with CS10F wheels type 2 (colour pink), then the increase in haze is determined; a PC sheet coated with the siloxane coating SHP401/AS4000 from GE Bayer Silicons which is scratched directly before or after under the same conditions at 1000 rotations and examined for an increase in haze is used as an internal reference; the relative Taber value is then defined by:

$$\text{relative Taber value} = \frac{\Delta\text{haze (sample)}}{\Delta\text{haze (reference)}}$$

(8) Extinction only of the coating (uncoated Makrolon® 2808 as reference); after that is the layer thickness at the measuring point (located on the edge of the sheet (sometimes directly on the draining edge, which is why here some larger layer thicknesses are measured compared with the measurement in (5)).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A multi-layer product comprising a first layer (S1) and a second layer (S2), the first layer being prepared from
   A) 20 to 95 wt. % of one or more aliphatic polymer precursors selected from the group consisting of
      A.1) aliphatic oligomers containing urethane bonds or ester bonds with at least two acrylate functions per molecule or mixtures of corresponding oligomers and
      A.2) aliphatic reactive diluents with at least two acrylate groups per molecule or mixtures of corresponding reactive diluents,
   B) 5 to 80 wt. % of one or more fine-particle inorganic compounds,
   C) 0.8 to 5 wt. % of at least one organic UV absorber which is a compound according to the following formula (IV)

(IV)

[chemical structure of triazine-based UV absorber with X, OH substituents on phenyl rings]

wherein
X=OCH($R^7$)COO$R^8$, wherein
$R^7$=CH$_3$, and
$R^8$=C$_8$H$_{17}$,
   D) 0 to 10 wt. % of one or more radical scavengers of the hindered amine light stabilizer (HALS) class
   E) 0 to 5 wt. % of one or more flow control agents
   F) one or more solvents in an amount such that a solids content of 20 to 50 wt. % for the mixture of components A, B and F results of, and
   G) 1 to 5 wt. %, based on the amount of components A and B of one or more compounds selected from the group consisting of bis(2,4,6-trimethylbenzoyl)-phenyl phosphine oxide, 2,4,6-trimethylbenzoylethoxyphenyl phosphine oxide, 2-methyl-1-[4-(methylthio)phenyl]-2-morpholino-1-propanone, and a mixture of bis(2,6-dimethoxy-benzoyl)(2,4,4-dimethylpentyl)phosphine oxide and (1-hydroxy-cyclohexyl)phenylmethanone wherein the amounts of components C, D and E are based on the weight of solids in the mixture of components A, B and F, the amount of components A and B total 100 wt. % and wherein the second layer comprises a thermoplastic polymer.

2. A multi-layer product according to claim 1, wherein the aliphatic reactive diluent (component A.2) is selected from the group consisting of 1,6-hexanediol diacrylate, tricyclodecane dimethanol diacrylate, trimethylol propane triacrylate, pentaerythritol tetraacrylate and the methacrylate derivatives thereof.

3. A multi-layer product according to claim 1, wherein component B is silicon dioxide with a mean particle size ($d_{50}$) of 1 to 200 nm.

4. A multi-layer product according to claim 3, wherein the silicon dioxide has a particle size distribution with a (($d_{90}$−$d_{10}$)/$d_{50}$) of the distribution of less than or equal to 2.

5. A multi-layer product according to one of claims 1, 2 to 4, wherein component D is one or more compounds of the following formula (V)

(V)

[chemical structure of piperidine with R$^9$ substituent and N—Y]

wherein
Y=H, $R^6$, or O$R^6$, wherein
$R^6$=branched or unbranched C$_1$-C$_{13}$ alkyl, C$_2$-C$_{20}$ alkenyl, C$_6$-C$_{12}$ aryl or —CO—C$_1$-C$_{18}$ alkyl, and
$R^9$=Z—$R^{10}$—Z—$R^{11}$,

[chemical structures showing Z—$R^{10}$—Z—piperidine-N—Y, or succinimide-$R^{11}$]

wherein
Z=C(O)O, NH or NHCO,
$R^{10}$=(CH$_2$)$_l$ with l=0 to 12, C=CH-Ph-OCH$_3$

[chemical structures of cyclic acetal and hindered phenol with $R^{11}$ substituent]

$R^{11}$=H or C$_1$-C$_{20}$ alkyl.

6. A multi-layer product according to claim 5, wherein component D is selected from the group consisting of bis(1-octyloxy-2,2,6,6-tetramethyl-4-piperidyl)sebacic acid ester, (3,5-di-tert.-butyl-4-hydroxy-benzyl)-butyl malonic acid-bis-(1,2,2,6,6-pentamethyl-4-piperidyl) ester and mixtures thereof.

7. A multi-layer product according to claim 1, wherein component F is one or more compounds selected from the group consisting of alkanes, alcohols, esters and ketones.

8. A multi-layer product according to claim 1, wherein the second layer comprises one or more compounds selected from the group consisting of polycarbonate, polyester carbonate, polyester, polyphenylene ethers and graft copolymers.

9. A multi-layer product according to claim 1 further comprising UV protective layer (S3) which contains a UV stabiliser according to formula (IV)

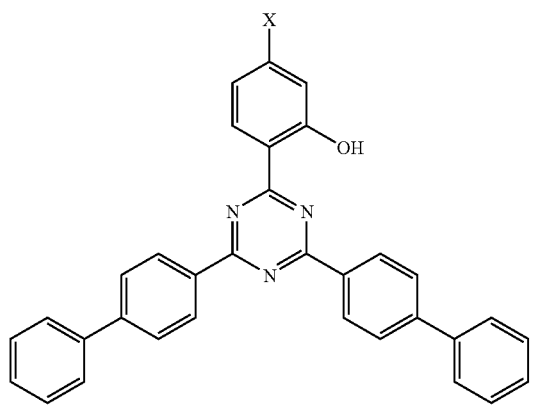

(IV)

wherein
X=OCH($R^7$)COOR$^8$, wherein
$R^7$=CH$_3$, and
$R^8$=C$_8$H$_{17}$,
and wherein the layer sequence is (S1)-(S2)-(S3) and layers (S1) and (S3) have the same or different compositions.

10. A coating obtained from
A) 20 to 95 wt. % of one or more aliphatic polymer precursors selected from the group consisting of
  A.1) aliphatic oligomers containing urethane bonds or ester bonds with at least two acrylate functions per molecule or mixtures of corresponding oligomers and
  A.2) aliphatic reactive diluents with at least two acrylate groups per molecule or mixtures of corresponding reactive diluents,
B) 5 to 80 wt % of one or more fine-particle inorganic compounds,
C) 0.8 to 5 wt. % of at least one organic UV absorber which is a compound according to the following formula (IV)

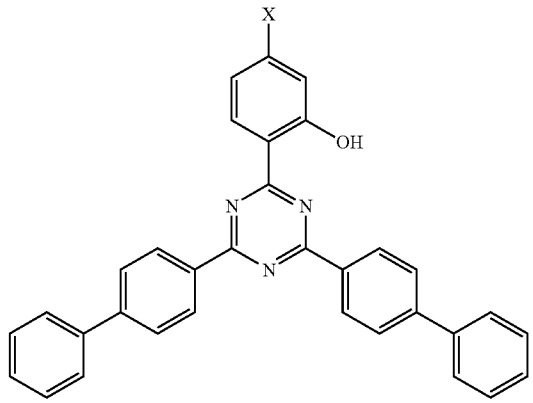

(IV)

wherein
X=OCH($R^7$)COOR$^8$, wherein
$R^7$=CH$_3$, and
$R^8$=C$_8$H$_{17}$,
D) 0 to 10 wt. % of one or more radical scavengers of the hindered amine light stabilizer (HALS) class
E) 0 to 5 wt. % of one or more flow control agents
F) one or more solvents in an amount such that a solids content of 20 to 50 wt. % for the mixture of components A, B and F results of, and
G) 1 to 5 wt. %, based on the amount of components A and B of one or more compounds selected from the group consisting of bis(2,4,6-trimethylbenzoyl)-phenyl phosphine oxide, 2,4,6-trimethylbenzoylethoxyphenyl phosphine oxide, 2-methyl-1-[4-(methylthio)phenyl]-2-morpholino-1-propanone, and a mixture of bis(2,6-dimethoxy-benzoyl)(2,4,4-dimethylpentyl)phosphine oxide and (1-hydroxy-cyclohexyl)phenylmethanone
wherein the amounts of components C, D and E are based on the weight of solids in the mixture of components A, B and F, the amount of components A and B total 100 wt. %,
which is suitable for the production of at least one layer of a multi-layer product according to claim 1.

11. A process for the production of a multi-layer product according to claim 1, comprising
  i) applying the first layer (S1) in the form of a coating formulation to the second layer (S2), and
  ii) curing the coating formulation of the first layer by exposing the first layer to UV radiation.

12. A multi-layer product according to claim 1, wherein the second layer comprises a plastic molding.

* * * * *